Figure 1:
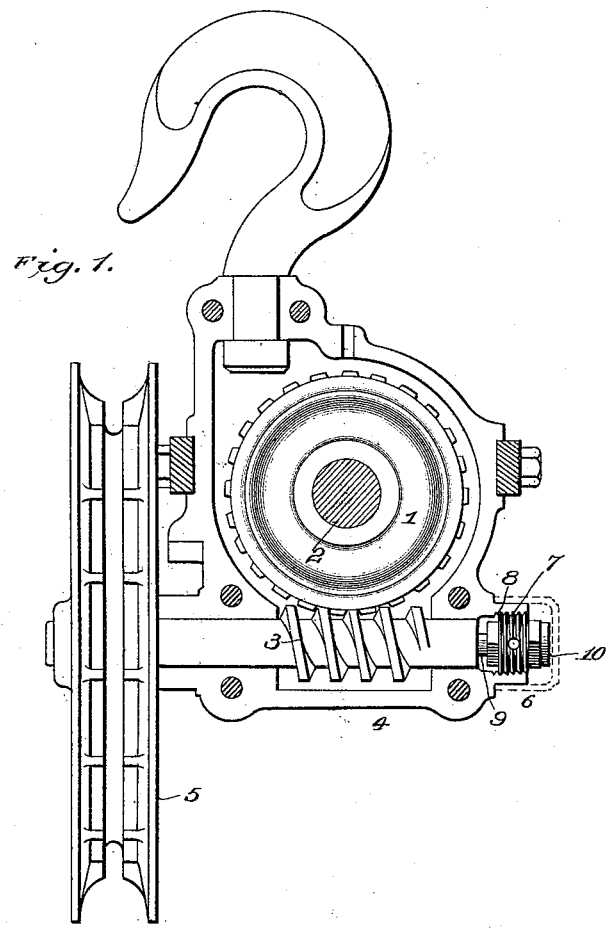

(No Model.) 2 Sheets—Sheet 1.

H. R. TOWNE.
CONVERTIBLE BEARING FOR SCREW PULLEY BLOCKS.

No. 512,071. Patented Jan. 2, 1894.

Witnesses:
Harry S. Rohrer
Walter E. Allen

Inventor:
Henry R. Towne.
By Knight Bros.
Attys.

(No Model.) 2 Sheets—Sheet 2.
H. R. TOWNE.
CONVERTIBLE BEARING FOR SCREW PULLEY BLOCKS.
No. 512,071. Patented Jan. 2, 1894.
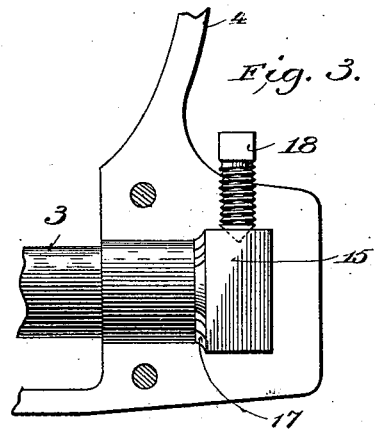
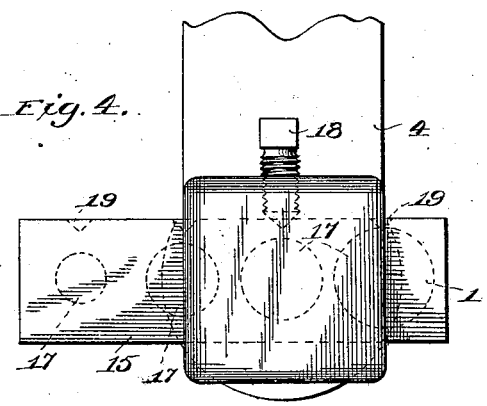
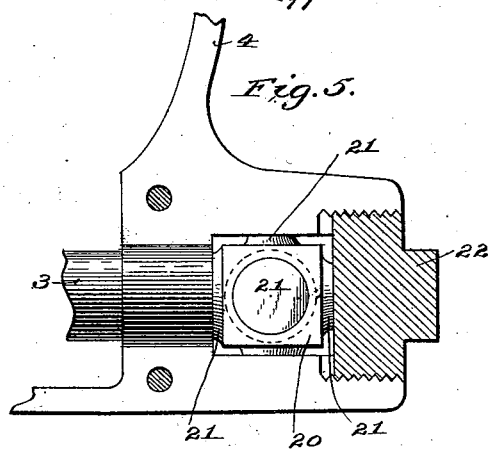
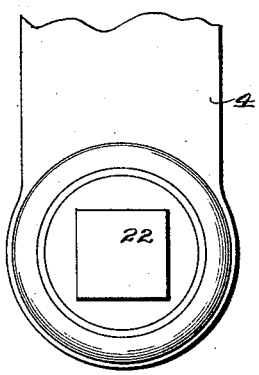
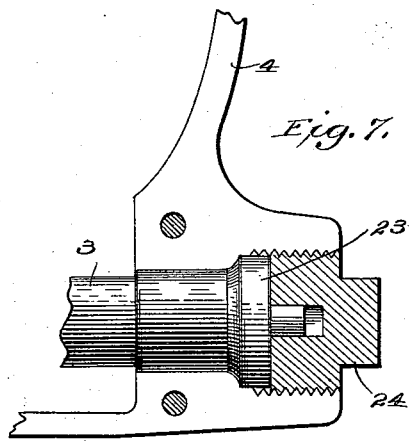
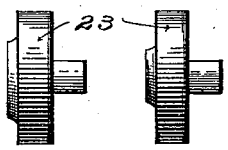
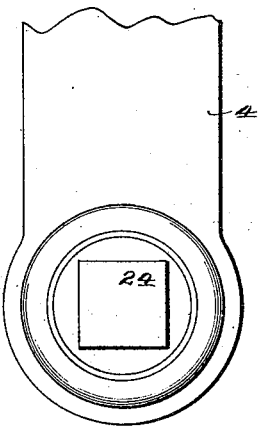
Witnesses:
Harry T. Rohrer
Walter E. Allen
Inventor:
Henry R. Towne
By Knight Bros.
Attys.

UNITED STATES PATENT OFFICE.

HENRY R. TOWNE, OF STAMFORD, CONNECTICUT, ASSIGNOR TO THE YALE & TOWNE MANUFACTURING COMPANY, OF SAME PLACE.

CONVERTIBLE BEARING FOR SCREW PULLEY-BLOCKS.

SPECIFICATION forming part of Letters Patent No. 512,071, dated January 2, 1894.

Application filed August 23, 1893. Serial No. 483,842. (No model.)

*To all whom it may concern:*

Be it known that I, HENRY R. TOWNE, a citizen of the United States, residing at Stamford, in the county of Fairfield and State of Connecticut, have invented an Improved Convertible Bearing for Screw Pulley-Blocks and other Purposes, of which the following specification, taken in connection with the accompanying drawings, is a full, clear, and exact description.

My invention relates to an improved form of thrust bearing for resisting the end thrust of the driving screw in a pulley block or other screw-hoisting machine, whereby different kinds of lowering action of the block or hoist can be obtained as desired. In these machines the chief purchase or gain of power is obtained by means of a worm or screw and worm-wheel, the proportions and pitch of which are so adjusted that the frictional resistance of the moving parts is about sufficient to hold the suspended load in any position and prevent the block from running down. By changing the proportions of the parts it is feasible to modify this frictional adjustment or balance so as to obtain either a "safety" lowering action, whereby the load will only descend as long as the mechanism is positively moved backward, by hand or otherwise, or to obtain a "dispatch" lowering action, whereby the load, when once started, will continue to run down by gravity until the motion of the machine is positively arrested. The preference between these two actions depends largely on the kind of work for which the block or hoist is used, it being desirable, for some purposes, to have a "safety" lowering action, and for others to have a "dispatch" lowering action. Hence it follows that a desirable feature in such blocks or hoists is a convenient means for converting the operation of the mechanism at will from one to the other of these modes of action. This is accomplished by the device which is the subject of my invention. I accomplish this by providing a thrust bearing or step at the end of the worm shaft or screw, of such construction as to enable me conveniently to modify the frictional resistance developed between this bearing and the shaft when the latter rotates. The pressure of this shaft and the resulting friction, are both obviously direct functions of the load but by varying the radius at which the friction on the end of the shaft acts it becomes possible to proportionately vary the frictional moment of resistance to the rotation of the shaft. If the end bearing of the shaft be limited to a small surface, of short radius from its center, less frictional moment will result than if such end bearing be of the full diameter of the shaft, or than if the center of the shaft be slightly cupped or recessed, so that the end thrust is carried on an annular bearing the external radius of which is equal to the radius of the end of the shaft. In each case the pressure is the same, but, acting at a longer radius in the latter case than in the first, the friction developed offers a greater moment of resistance to the rotation of the shaft. By suitably proportioning the several parts of my improved thrust bearing with reference to the proportions of the other parts of the machine, I am able to obtain either the "dispatch" lowering or the "safety" lowering actions above referred to.

While the object of my invention may be accomplished by various constructions of thrust bearing, I have deemed it sufficient to illustrate and describe specifically only a few of the preferred constructions.

For the purpose of illustrating the application of my invention, I have shown it applied to the form of pulley block disclosed in Patent No. 496,328, granted April 25, 1893, to Benjamin L. Toquet.

Figure 2:
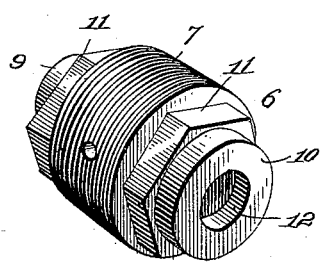

In the accompanying drawings:—Figure 1 is a side elevation of a pulley block having one half of the casing removed and showing the preferred form of my improved convertible end bearing in place. Fig. 2 is a perspective view of the bearing plug removed. Figs. 3, 4, 5, 6, 7, 8 and 9 are detail views of modified forms of thrust bearings constructed in accordance with my invention.

1 is the worm-wheel journaled on the gudgeons 2 and provided with suitable chain wheels which are not shown.

3 is the worm or screw having suitable bearings in the lower part of the casing 4 and provided on its projecting end with the power wheel 5.

6 is a reversible bearing plug or step embodying the features of my invention in the form in which I prefer to use it. This plug consists of a central portion 7 screw-threaded exteriorly for engagement with a screwed recess 8 in the casing or frame of the hoist and having differential friction bearings at its two ends, 9 and 10, the former being of small and the latter being of large diameter.

11 represents hexagonal or square shoulders at each end of the bearing plug adapted to engage with a suitable wrench for the purpose of inserting and removing the plug.

12 is a central recess or cutaway portion in the larger end bearing 10 for the purpose of increasing the radial distance of the frictional surface. It will be seen that the end thrust of the screw shaft, due to the reaction of the suspended load, is taken up by the bearing plug against which the end of the screw bears when in place. With the small end of the plug in contact with the shaft "dispatch" lowering action may be obtained while by reversing it, so that the large end of the plug bears on the shaft, the "safety" lowering action may be obtained. The bearing plug can be easily removed and reversed by means of a wrench and the lowering action of the block thus be converted from "dispatch" to "safety," or vice versa, as desired.

Obviously my improved bearing plug may be made of any kind of metal, or may have inserted in its ends other frictional materials such as brass, wood or leather.

In Figs. 3 and 4, I have shown my improved convertible thrust bearing in the form of a sliding bar 15 which rests in the transverse opening 16 in the casing 4, and is provided with a series of bearings 17 on its inner face. These bearings 17 are of different diameters and are adapted to be presented to the end of the worm shaft 3 by simply sliding the bar 15 along in its bearing. The set-screw 18 works in a suitable screw-threaded opening in the casing and engages the depressions 19 in the upper face of the bar for holding it in position.

The form of bearing shown in Figs. 5 and 6, consists of a cubical block or body portion 20, having a different sized bearing 21 on each face of the block, which are adapted to be presented to the end of the worm shaft by removing the block and inserting it in a different position. 22 is a screw plug which engages in the screw-threaded opening in the casing and bears against the block 20 for holding it in place.

In Figs. 7, 8 and 9, the changeable bearings consist of small disks or buttons 23 of different diameters held in place against the end of the shaft by means of a removable screw plug 24. Any one of the buttons may be inserted in the end of the plug and held against the end of the screw shaft, in order to modify the frictional moment and obtain the desired lowering action.

Any of these or other like modifications of detail may be made without departing from the spirit of my invention, the essence of which is a convertible or changeable frictional device whereby the lowering action of a screw hoist or block may be controlled and modified as desired.

Having thus fully described my invention, the following is what I claim as new therein and desire to secure by Letters Patent:

1. A removable thrust bearing for screw hoists, provided with two or more bearing surfaces which are adapted to be brought in contact with the end of the worm shaft at will, so as to cause varying frictional resistances to the rotation of the shaft, as set forth.

2. A removable thrust bearing for screw hoists provided with two or more bearing surfaces of different diameters, which are adapted to be brought in contact with the end of the worm shaft at will for the purpose of causing varying frictional resistances to the rotation of the shaft, as set forth.

3. A removable bearing plug for screw hoists provided with bearing ends having surfaces which respectively present greater or less frictional resistance to the rotation of the shaft, substantially as and for the purpose set forth.

4. A reversible end thrust bearing plug for screw hoists constructed with the central threaded body portion, and the bearing ends of different diameters, substantially as and for the purpose set forth.

5. A reversible end thrust bearing plug for screw hoists constructed with the bearing ends of different diameters and having one of the bearing ends centrally recessed, substantially as and for the purpose set forth.

6. A reversible end thrust bearing plug for screw hoists, constructed with the central threaded body portion, the bearing ends of different diameters, and the squared faces or shoulders for the engagement of a wrench, substantially as and for the purpose set forth.

HENRY R. TOWNE.

Witnesses:
SCHUYLER MERRITT,
GEO. E. WHITE.